United States Patent Office 3,133,058
Patented May 12, 1964

3,133,058
PREPARATION OF OXIDO STEROIDS
Robert P. Graber and Martin B. Meyers, Minneapolis,
Minn., assignors to General Mills, Inc., a corporation of
Delaware
No Drawing. Filed Sept. 29, 1960, Ser. No. 59,203
5 Claims. (Cl. 260—239.55)

This invention relates to a novel method for preparing α-oxido steroid compounds and to novel intermediates in the preparation thereof. In particular this invention relates to a method of converting the mixture of α and β epoxides, normally obtained by reacting unsaturated steroid compounds with per-acids, to the highly desirable α-isomer alone.

As is well known, the reaction of an unsaturated steroid with a per-acid usually produces a mixture of oxirane compounds. In general, the α-oriented isomer usually predominates and this often permits harvesting by crystallization or other procedures, of a substantial proportion of the desired α-isomer. However, the problem then remains of recovery of the balance of the starting materials. One proposed method of solving the problem is to regenerate the unsaturated starting materials, for example, by a procedure involving the use of sodium iodide and zinc. Such procedure is, however, expensive and possesses a disadvantage in that re-epoxidation again generates the mixture of isomers, which must then again be separated and recycled.

It has now been discovered that a mixture of α and β epoxides of a steroid compound may be converted to the α-oxido steroid compound alone by opening the oxirane ring to produce a single transdiol, one of the hydroxyl groups being a secondary hydroxyl group, and regeneration of only the α epoxide by esterification of the secondary hydroxyl group and elimination of the ester group thus formed by treatment with weak alkali. This method is applicable to the mixture of α and β epoxides of any 5,6-unsaturated steroid compound. Upon opening the oxirane ring of the mixed isomers with perchloric acid, for example, a single transdiol results, one of the hydroxyl groups of which is tertiary, the companion hydroxyl group being secondary. The tertiary hydroxyl group is not readily esterifiable while the secondary hydroxyl group is readily reactive with alkyl sulfonyl halides such as methane sulfonyl chloride. It was discovered that heating the ester formed in a weak alkali solution in a solvent which does not add to double bonds provides the highly desired α-isomer while other ester groups present in the molecule are retained and 16,17-double bonds are unattacked.

These α-isomers are desirable since they may be used for the preparation of the 6 alkyl progesterones or corticoids.

It is, therefore, an object of this invention to provide a method of converting a mixture of α and β epoxides of esters of a 5,6-unsaturated steroid compound to the α-isomer alone, while retaining the ester group.

It is also an object of this invention to provide such a method of converting to the α-isomer alone, a mixture of α and β-oxido 3-acyloxy steroid compounds such as those having the general formulae:

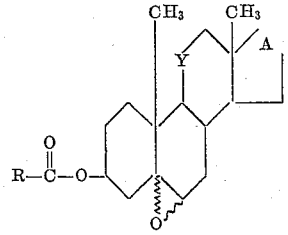

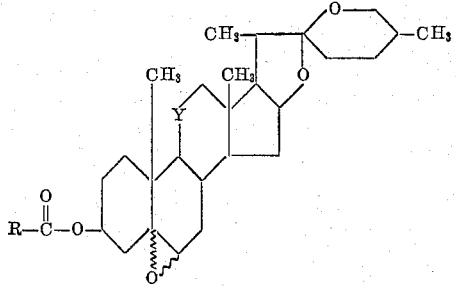

where R is an alkyl group having from 1 to 11 carbon atoms, Y is selected from the group consisting of

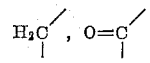

and

and A is selected from the group consisting of

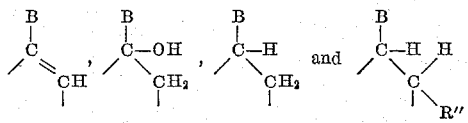

where B is selected from the group consisting of

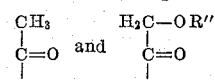

where R'' is an alkyl group having from 1 to 8 carbon atoms and R''' is selected from the group consisting of hydrogen and acyl radicals having from 1 to 12 carbon atoms. R''' may be the same acyl radical as

or may be different therefrom such as

where $R_a$ is an alkyl group having from 1 to 11 carbon atoms.

It is also an object of this invention to provide novel compounds in carrying out such method, said compounds having the general formulae

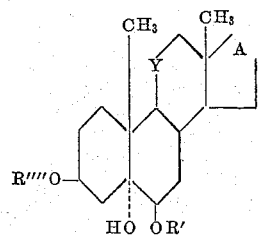

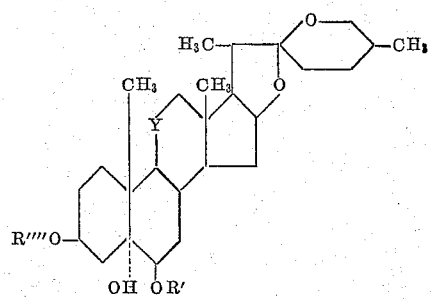

where R'''' is H or

R' is H or R''''' sulfonyl where R''''' is an alkyl group having from 1 to 8 carbon atoms, and R, A, and Y are as previously defined above.

It is still a further object of this invention to provide compounds of the general formula

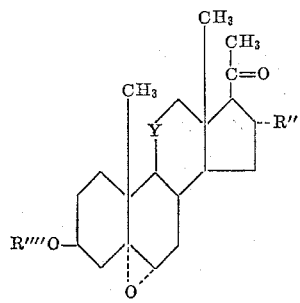

where R'''', R'' and Y are as previously defined above.

The novel process may be illustrated by the following reaction scheme:

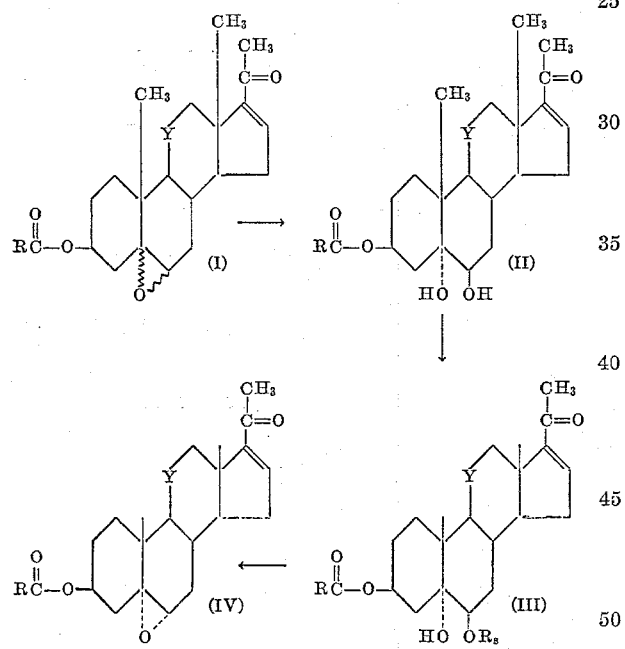

where R is an alkyl radical having from 1 to 11 carbon atoms, $R_s$ is R''''' sulfonyl and R''''' is an alkyl group having from 1 to 8 carbon atoms and Y is selected from the group consisting of

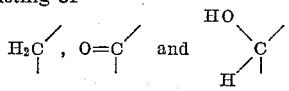

Formulae II and III may be represented generally by the following formula:

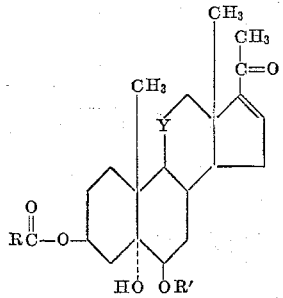

where R is an alkyl group having from 1 to 11 carbon atoms, R' is selected from the group consisting of H and R''''' sulfonyl and R''''' is an alkyl group having from 1 to 8 carbon atoms and Y is selected from the group consisting of

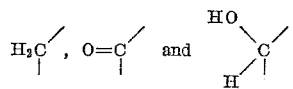

These compounds may also be converted to the hydroxyl group at the 3 position on removal of the ester radical.

The above schematic representation is to be understood as representing a simplified illustration of the reaction scheme and is not intended as limiting the application of the process solely to the compounds shown therein. For example, the D ring may be generalized as previously described, the preceding schematic representation showing A only as

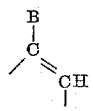

where B is

It is hereby understood that A and B may be further defined as previously described. In addition, it is hereby understood that compounds similar to Formula I but having further ring structure may also be employed such as

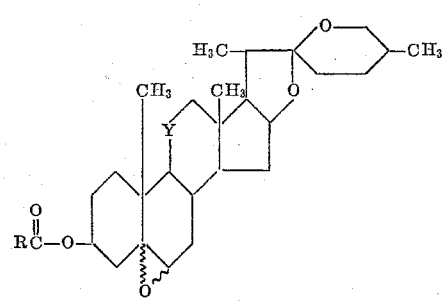

where R and Y are as previously defined. It will also be immediately apparent to those skilled in steroid chemistry that many other different substituents may be present in other parts of the molecule.

The starting material represented by Formula I may be prepared by the well known methods of epoxidation of unsaturated steroid compounds with per-acids to produce the mixture of α and β isomers. In this particular instance, 16-dehydropregnenolone acetate was reacted with a per-acid to form the mixture of isomers used as the starting material for illustrating the present invention. While the acetate is used herein for the purposes of illustration, it is understood that any alkyl ester having from 1 to 12 carbon atoms may be employed as indicated previously hereinabove.

For the purpose of illustrating the present invention the starting material employed was the mixed 5,6, α and β oxides of 16-dehydropregnenolone acetate corresponding to Formula I when R is acetate and R'' is $H_2$. These mixed α and β isomers were then reacted with perchloric acid in aqueous acetone to open the oxirane rings of the mixed isomers to produce a single transdiol as represented by Formula II. In place of perchloric acid, other acids may be used, illustrative thereof being periodic acid and sulfuric acid. In place of aqueous acetone, other solvent systems may be used, illustrative thereof being aqueous tetrahydrofuran and aqueous dioxane.

The 6-beta hydroxyl group was then esterified in pyridine with methane sulfonyl chloride to provide a compound represented generally in Formula III, where R' is a methane sulfonyl grouping. Other such esterifying agents where the alkyl groups has from 1 to 8 carbon atoms may be used. While the esterification was conducted in pyridine, the invention is not limited thereto and other systems may be used, illustrative thereof being collidine, lutidine.

The α-oxido compound is then formed by heating the ester in the presence of weak alkali such as an aqueous mixture of sodium bicarbonate and pyridine. The resulting product is the α isomer and the acetyl group is retained throughout the process. Alkali metal or alkaline earth metal bicarbonates may be employed in place of the sodium bicarbonate such as potassium, calcium, and lithium. Other solvent systems may be employed in place of the aqueous pyridine, including collidine, lutidine, or acetone.

The following examples are illustrative of the process and products of the present invention, but are not to be construed as limiting the invention.

Example I

To a solution of 10.5 g. of the mixed 5,6α and β oxides of 16-dehydropregnenolone acetate in 200 ml. of acetone there was added with stirring 100 ml. of a 1.5 N aqueous perchloric acid solution. After 30 minutes 25 ml. of water was added to the mixture and after another 30 minute period the mixture was placed in a refrigerator and allowed to stand 90 minutes. The residue obtained on filtration was washed successively with two 100 ml. portions of 1:1 water:acetone, two 50 ml. portions of 5% aqueous sodium bicarbonate solution and finally with two 50 ml. portions of water. Drying gave 9.2 g. of 16-pregnen-3β,5α,6β-triol-20-one 3-acetate melting at about 241–250°. Recrystallization from methanol raised the melting point to 249–251°, $[\alpha]_D^{26} = -7.0°$ (dioxane), $$\lambda_{max.}^{EtOH}\ 240\ m\mu,\ \epsilon = 9560$$

Example II

A solution of 16-pregnen-3β,5α,6β-triol-20-one 3-acetate (2.0 g.) in 15 ml. of dry pyridine was cooled to 0° and 1.4 ml. of methanesulfonyl chloride was added and the resulting mixture allowed to stand 16 hours at 6°, then at room temperature for 2½ hours. The mixture was poured onto crushed ice and extracted with 150 ml. of ether. The upper layer was separated and washed successively with water, with 1 N aqueous hydrochloric acid, with water, with 5% aqueous sodium bicarbonate solution, twice with water and finally with saturated aqueous salt solution. The washed extract was dried over anhydrous magnesium sulfate. Evaporation of the solvent left 2.25 g. of a foam, which on recrystallization from ether afforded 16-pregnen-3β,5α,6β-triol-20-one 3-acetate 6-mesylate melting at about 113–118° (dec.) $[\alpha]_D^{24} = -32.3°$ (CHCl$_3$).

*Analysis.*—Calculated for $C_{24}H_{36}O_7S$: C, 61.51; H, 7.74. Found: C, 61.22; H, 7.70.

Example III

A solution of 10.0 g. of 16-pregnen-3β,5α,6β-triol-20-one 3-acetate in 75 ml. of pyridine was cooled to 0° and 7.0 ml. of methanesulfonyl chloride added. After standing for 16 hours at 6°, the mixture was allowed to rise to room temperature in a 2½ hour period, then poured into 75 ml. of water containing 22 g. of sodium bicarbonate. The resulting mixture was heated to reflux for 15 minutes, after which water was added until precipitation was complete. Filtration afforded 8.94 g. of 5α,6α-oxido-16-pregnen-3β-ol-20-one acetate melting at about 190–195°.

Example IV

A mixture of 1.0 liter of 40% peracetic acid and 100 g. of anhydrous sodium acetate was cooled to 1–2° C. With stirring, a solution of 1000 g. of pregnenolone acetate in 2.0 liters of chloroform was added slowly over a period of one hour and 45 minutes. The mixture was stirred and maintained at 0–3° C. for an additional 2 hours. The mixture was then transferred to a separatory funnel and the chloroform solution washed with four 500 ml. portions of water, three 500 ml. portions of 5% aqueous sodium bicarbonate solution and finally with three 500 ml. portions of water until neutral. The solvent layer was dried over anhydrous sodium sulfate, filtered, and the solvent removed in vacuo to give 1037 g. of the mixed α- and β-oxides of pregnenolone acetate as a crude crystalline residue. Infrared spectral analysis indicated that the 5α,6α-oxide predominated over the 5β,6β-oxide in a ratio of about 4:1. This mixture was used directly in the following reaction.

Example V

A 100 g. portion of the mixed 5α,6α- and 5β,6β-oxides of pregnenolone acetate was dissolved in 2.0 liters of acetone. With stirring and external cooling, 1000 ml. of 1.5 N aqueous perchloric acid was added over a 10 minute period to the above acetone solution. The temperature of the mixture rose from 20° C. to 28° C. and white solid separated during the addition. The suspension was stirred for 30 minutes at about room temperature then diluted with 250 ml. of water and stirred for an additional 30 minutes. After cooling to 8° C. for two hours, the suspension was filtered, and the crystals washed successively with two 350 ml. portions of 1:1 acetone:water, two 250 ml. portions of 5% aqueous sodium bicarbonate solution and two 250 ml. portions of water until neutral. The product was dried in vacuo. The crude product was suspended in 250 ml. of hot methanol, the suspension cooled to 5° C. and filtered. The coke was washed once with 150 ml. of cold methanol and dried to give 81 g. of pregnan-3β,5α,6β-triol-20-one 3-acetate, M.P. 212.5–226.5° C. A second crop was obtained from the methanol filtrate, weight 14 g., M.P. 205–220° C. A pure sample prepared by recrystallization from acetone had the M.P. 227–232° C.

Example VI

A 392.5 mg. portion of the triol monoacetate (pregnan-3β,5α,6β-triol-20-one 3 acetate) in 3.0 ml. of dry pyridine was treated with 0.265 ml. of methanesulfonyl chloride. The mixture was stored at 0–5° C. for 16 hours, then at room temperature for 5 hours. The mixture was poured onto ice and the product extracted with ether. The ether solution was washed twice with ice cold 1 N hydrochloric acid, once with ice water, once with ice cold 5% sodium bicarbonate solution, twice with ice water, and once with ice cold saturated salt solution. After filtering through anhydrous magnesium sulfate the ether was removed at room temperature to give 410 mg. of crude crystalline 6-mesylate $\lambda_{max.}^{CCl_4}$ 5.78μ (acetate), 5.87μ (20-ketone), 8.1μ (acetate) and 8.49μ (6-mesylate)

Recrystallization from acetone-ether gave 168 mg. of pregnan-3β,5α,6β-triol-20-one 3-acetate-6-mesylate as prisms, M.P. 137–139° dec. and gas evolution $$\lambda_{max.}^{CCl_4}$$

as above.

Example VII

A 30 g. portion of the above triol 3-monoacetate (pregnan-3β,5α,6β-triol-20-one 3-acetate) was dissolved with warming in 225 ml. of dry pyridine and the solution cooled to 5° C. A slight amount of crystals separated. The suspension was stirred and 21.0 ml. of methanesulfonyl chloride was added over a period of 10 minutes. The temperature rose to 14° C. The solution was cooled again to 8° C. and stored at 0–5° C. for 16 hours. A small amount of crystalline solid separated during this time. The mixture was then placed in a water bath at room temperature for 2 hours.

A suspension of 66 g. of sodium bicarbonate in 225 ml. of water was cooled to 5° C. The above reaction mixture was poured slowly with stirring into the bicarbonate suspension. A moderate evolution of gas occurred and the temperature of the mixture rose to 14° C. The mixture was quickly heated to reflux and maintained at reflux for 20 minutes. After cooling quickly to about 50° C., 500 ml. of warm water (50° C.) was added slowly with stirring. Crystalline solid separated. This suspension was then poured slowly into 1000 ml. of warm water (50° C.), the final suspension cooled to 6° C. and filtered. The product was washed repeatedly with water and dried to a damp cake. This damp cake was dissolved in 350 ml. of hot methanol, the solution treated with Darco G–60 and filtered. Concentration of the filtrate to 250 ml. and cooling to 5° C. gave a first crop of 5α,6α-oxidopregnan-3β-ol-20-one 3-acetate (pregnenolone acetate 5α,6α-oxide). The crystals were separated by filtration, washed with 200 ml. of cold methanol and dried to give 22 g., M.P. 168.5–170° C. Concentration of the mother liquors gave a second crop, 3.0 g., M.P. 168–170° C. and a third crop, 1.0 g., M.P. 167–169° C. All three samples were identical by mixed M.P. determinations and infrared comparison to pregnenolone acetate 5α,6α-oxide prepared by fractional crystallization of the original mixed oxides.

*Example VIII*

To a stirred, cooled (−2° to 0° C.) suspension of 3.7 g. of sodium acetate in 37.25 ml. of chloroform was added over 30 minutes a solution of 37.25 g. of 16α-methylpregnenolone acetate in 74.5 ml. of chloroform. After stirring for an additional 3 hours at 0–3° C., the mixture was poured into 50 ml. of water, the chloroform layer separated and washed successively as follows: three times with water, three times with 5% aqueous ferrous sulfate, twice with water, once with 5% aqueous sodium bicarbonate and three times with water. The chloroform solution was dried over sodium sulfate and the solvent removed to give 38.8 g. (100%) of the mixed 5α,6α- and 5β,6β-oxides of 16α-methylpregnenolone acetate in the ratio of about 4:1 as indicated by infrared spectral analysis. This mixture was used directly in the following hydrolytic cleavage to the 3β,5α,6β-triol 3-monoacetate.

*Example IX*

The 38.8 g. of mixed 5α,6α- and 5β,6β-oxides of 16α-methylpregnenolone acetate was dissolved in 666 ml. of acetone and 333 ml. of 1.5 N aqueous perchloric acid added slowly over 15 minutes with stirring. The temperature was maintained below 20° C. Solid separated slowly after all the perchloric acid had been added. The mixture was stored at room temperature for 30 minutes and then slowly diluted with 200 ml. of water. After cooling to 10° C. for 2–3 hours, the suspension was filtered and the residue washed as follows: twice with 200 ml. of water, twice with 200 ml. of 5% aqueous sodium bicarbonate solution and three times with 200 ml. portions of water until neutral. After drying in vacuo there was obtain 33.25 g. of 16α-methylpregnan-3β,5α,6β-triol-20-one 3-acetate, M.P. 220–223° C.

*Example X*

The 16α-methylpregnan - 3β,5α,6β - triol 3-acetate-6-mesylate was prepared by mesylation of the corresponding triol monoacetate with methanesulfonyl chloride in pyridine as described in Example VI.

*Example XI*

To a stirred ice cold solution of 33.2 g. of triol monoacetate (16α-methylpregnan - 3β,5α,6β - triol - 20 - one 3-acetate) in 242 ml. of dry pyridine was added 22.5 ml. of methanesulfonyl chloride over a period of 7 minutes. The reaction mixture was stored at 0–5° C. overnight and at room temperature for 3 hours. A small amount of crystalline solid had separated which was later shown to be water soluble. The solution was decanted slowly into a stirred suspension of 71 g. of sodium bicarbonate in 242 ml. of water. The suspension was quickly heated to reflux and maintained at reflux for 15 minutes. The mixture was slowly diluted with 825 ml. of water, cooled to 10° C. and filtered. The residue was washed with water until neutral and substantially free of pyridine odor. The dried crude product was dissolved in methylene chloride, the solution treated with Darco G–60 and filtered. The methylene chloride was distilled until crystals began to separate. This slurry was diluted with methanol and the distillation continued. The thick suspension was cooled to 0–5° C., filtered and the residue washed with cold methanol. After drying there was obtained 12.3 g. of α-oxide acetate (5α,6α-oxido-16α-methylpregnan-3β-ol-20-one 3-acetate), M.P. 167–169° C. Further crops were obtained by concentration of the mother liquor, as follows: 9.6 g., M.P. 167–169° C.; 2.9 g., M.P. 167–168° C.; 4.0 g., M.P. 166–167.5° C. Thus in all 28.8 g. (87.7%) of good α-oxide acetate was obtained. The material obtained was identical to material prepared by repeated crystallization of the mixed 5α,6α- and 5β,6β-oxide acetate.

*Example XII*

To a stirred ice cold suspension of 17.7 g. of sodium acetate in 177 ml. of 40% peracetic acid, 550 ml. of methylene chloride and 550 ml. of acetone was added over 30 minutes a solution of 300 g. of diosgenin acetate in 2730 ml. of methylene chloride. The temperature was maintained at 0–3° C. during the addition and for an additional 30 minutes after the addition. The mixture was then held at room temperature for 5 hours. After transferring to a separatory funnel, the methylene chloride solution was washed successively with three 2.0 liter portions of water, one 1.0 liter portion of 5% aqueous ferrous sulfate solution, one 1.5 liter portion of water, once with 1.5 liter of 5% aqueous sodium bicarbonate solution and twice with 1.5 liter portions of water until neutral. The solution was dried over anhydrous sodium sulfate, filtered and evaporated to dryness in vacuo to give 313 g. of the 5α,6α- and 5β,6β-oxides of diosgenin acetate as a crystalline solid. The α-oxide predominates over the β-oxide in a ratio of about 4:1 as indicated by infrared analysis.

*Example XIII*

A 170 g. portion of the mixed 5α,6α- and 5β,6β-oxides of diosgenin acetate in 2440 ml. of tetrahydrofuran was stirred and 1640 ml. of 1.5 N aqueous perchloric acid was added slowly over a period of one hour and 10 minutes. The temperature of the mixture was held at 20–25° by means of a cooling bath. After about one half the perchloric acid had been added, solid began to separate. The suspension was stirred for an additional one hour and then slowly diluted with 2.0 liters of water. The resulting suspension was further diluted by pouring it into 12.0 liters of water with stirring. The solids were removed by filtration and washed with 4.0 liters of water in portions followed by two 1.0 liter portions of 5% aqueous sodium bicarbonate solution. Final washing with 4.0 liters of water in portions gave the product, 5α,6β-dihydroxytigogenin acetate, weighing 169.5 g. (96.3%), M.P. 274–279° C.

*Example XIV*

The 5α-hydroxy-6β-mesyloxytigogenin acetate was prepared in the same manner as in Example VI.

*Example XV*

A solution of 169 g. of 5α,6β-dihydroxytigogenin acetate in 1270 ml. of dry pyridine was cooled to 2° C. With stirring 120 ml. of methanesulfonyl chloride was added over a 35 minute period maintaining the temperature between 0° and 5° C. The reaction mixture was stored at 0–5° C. for 16 hours, followed by 3½ hours at room temperature. The mixture was then poured slowly into a stirred suspension of 370 g. of sodium bicarbonate in 1270 ml. of water at room temperature. The vigorous foaming caused by the evolution of carbon dioxide was controlled by addition of a small quantity of octyl alcohol.

The mixture was diluted with 370 ml. of pyridine and heated rapidly to reflux. Reflux was maintained for 20 minutes and then the mixture was quickly cooled to about 50° C. and slowly diluted with stirring with 5.5 liters of water. The suspension was further cooled to 20° C. and filtered. The residue was washed with 8.0 liters of water in portions, then resuspended in 4.0 liters of water and refiltered. The residue was again washed with 8.0 liters of water in portions, sucked dry and finally dried in vacuo at 50° C. to give 160 g. of tan colored solid, M.P. 215–218° C.

A solution of 159 g. of this crude product in 675 ml. of methylene chloride was treated with 5% by weight of Nuchar. The suspension was heated to boiling, filtered and distilled to a volume of 300 ml. Addition of 400 ml. of hot methanol caused crystallization. After cooling to room temperature, the diosgenin acetate 5α,6α-oxide was removed by filtration, washed twice with methanol and dried, weight 101.6 g., M.P. 227–228°. A second crop weighing 41.6 g., M.P. 224–225°, was isolated by concentration of the mother liquor. These products were identical by mixed melting point and infrared comparisons to material prepared by tedious fractional crystallization of the above diosgenin acetate 5α,6α- and 5β,6β-oxide mixture.

It is to be understood that the invention is not to be limited to the exact details of operation or exact compounds shown and described, as obvious modifications and equivalents will be apparent to one skilled in the art and the invention is to be limited only by the scope of the appended claims.

The embodiments of the invention in which an exclusive property or privilege is claimed are defined as follows:

1. In a process of preparing α-oxido compounds of the formulae

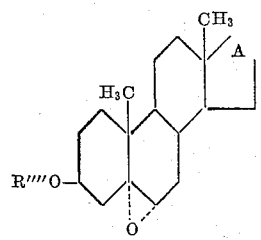

and

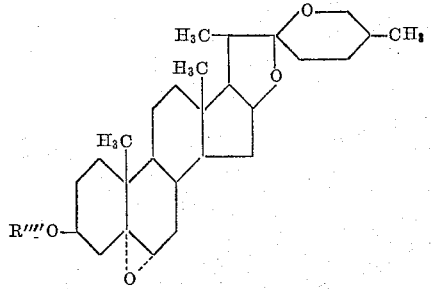

where R'''' is selected from the group consisting of H and

where R is an alkyl group having from 1 to 11 carbon atoms, A is selected from the group consisting of

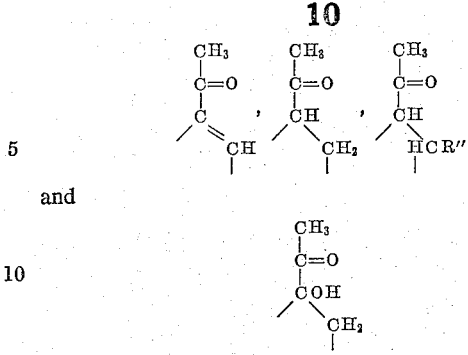

and

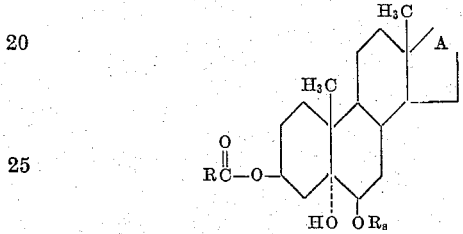

where R'' is an alkyl group having from 1 to 8 carbon atoms from a mixture of the 5,6-α and β-oxido compounds thereof, the step of heating a compound selected from the group consisting of

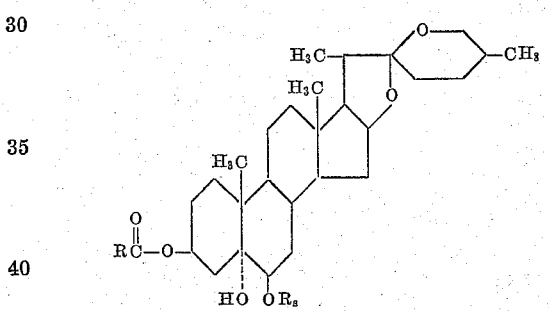

and where $R_s$ is R''''' sulfonyl and R''''' is an alkyl group having from 1 to 8 carbon atoms and R and A are as defined above, in a solution of a weak alkaline compound selected from the group consisting of the alkali metal and alkaline earth metal bicarbonates.

2. A process as defined in claim 1 in which R'' is methyl.

3. A process as defined in claim 1 in which said alkaline solution is a solution of sodium bicarbonate in aqueous pyridine.

4. A process as defined in claim 1 in which $R_s$ is methanesulfonyl.

5. A process as defined in claim 1 in which R is methyl.

References Cited in the file of this patent

UNITED STATES PATENTS

| | | |
|---|---|---|
| 2,695,260 | Murray et al. | Nov. 23, 1954 |
| 2,878,246 | Miramontes et al. | Mar. 17, 1959 |
| 2,966,502 | Nawa et al. | Dec. 27, 1960 |

OTHER REFERENCES

Furst et al.: Helv. Chim. Acta, 30, 1947, pages 1454–1460.

UNITED STATES PATENT OFFICE
CERTIFICATE OF CORRECTION

Patent No. 3,133,058            May 12, 1964

Robert P. Graber et al.

It is hereby certified that error appears in the above numbered patent requiring correction and that the said Letters Patent should read as corrected below.

Column 2, lines 20 to 23, the formula should appear as shown below instead of as in the patent:

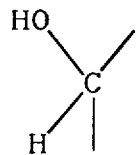

same column, lines 31 to 34, the second formula should appear as shown below instead of as in the patent:

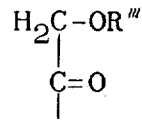

column 3, line 60, for "generally" read -- generically --;
column 7, line 55, for "obtain" read -- obtained --.

Signed and sealed this 29th day of September 1964.

(SEAL)
Attest:

ERNEST W. SWIDER            EDWARD J. BRENNER
Attesting Officer            Commissioner of Patents